(12) United States Patent
Liu et al.

(10) Patent No.: US 8,532,114 B2
(45) Date of Patent: Sep. 10, 2013

(54) CLUSTER ROUTER AND CLUSTER ROUTING METHOD

(75) Inventors: Enhui Liu, Beijing (CN); Zhanfeng Wang, Shenzhen (CN); Qingzhi Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/438,299

(22) Filed: Apr. 3, 2012

(65) Prior Publication Data

US 2012/0189019 A1 Jul. 26, 2012

Related U.S. Application Data

(63) Continuation of application No. PCT/CN2010/071386, filed on Mar. 29, 2010.

(51) Int. Cl.
*H04L 12/28* (2006.01)

(52) U.S. Cl.
USPC ............... 370/395.31; 370/419; 370/465

(58) Field of Classification Search
None
See application file for complete search history.

(56) References Cited

U.S. PATENT DOCUMENTS

| | | | |
|---|---|---|---|
| 6,496,510 B1 * | 12/2002 | Tsukakoshi et al. | 370/401 |
| 6,665,304 B2 * | 12/2003 | Beck et al. | 370/401 |
| 6,993,034 B1 * | 1/2006 | Block et al. | 370/401 |
| 7,406,086 B2 * | 7/2008 | Deneroff et al. | 370/400 |
| 7,443,787 B2 * | 10/2008 | Karino et al. | 370/218 |
| 7,483,998 B2 * | 1/2009 | Rabinovitch | 709/238 |
| 7,881,321 B2 * | 2/2011 | Deneroff et al. | 370/412 |
| 2002/0012352 A1 * | 1/2002 | Hansson et al. | 370/401 |
| 2002/0129086 A1 * | 9/2002 | Garcia-Luna-Aceves et al. | 709/200 |
| 2005/0135343 A1 * | 6/2005 | Karino et al. | 370/352 |
| 2005/0169265 A1 | 8/2005 | Monette et al. | |
| 2005/0169276 A1 | 8/2005 | Monette et al. | |
| 2006/0209830 A1 | 9/2006 | Oguchi et al. | |
| 2006/0256767 A1 * | 11/2006 | Suzuki et al. | 370/351 |
| 2007/0194807 A1 * | 8/2007 | Reblewski et al. | 326/38 |
| 2012/0209581 A1 * | 8/2012 | Gao et al. | 703/13 |

FOREIGN PATENT DOCUMENTS

| | | |
|---|---|---|
| CN | 101355430 A | 1/2009 |
| CN | 101931587 A | 12/2010 |
| EP | 0 969 630 A1 | 1/2000 |

OTHER PUBLICATIONS

Yang, et al., "Forwarding and Control Element Separation (ForCES) Framework, draft-ietf-forces-framework-08.txt", Internet Draft, pp. 1-34, (Aug. 2003).

Nguyen, et al., "A Distributed and Scalable Routing Table Manager for the Next Generation of IP Routers", IEEE Network, pp. 6-14, (Mar./Apr. 2008).

(Continued)

*Primary Examiner* — Michael J Moore, Jr.
(74) *Attorney, Agent, or Firm* — Slater & Matsil, L.L.P.

(57) ABSTRACT

A cluster router includes at least one control apparatus and at least two forwarding apparatuses. The control apparatus is connected to the forwarding apparatuses, and the forwarding apparatuses are connected with each other. The control apparatus is configured to generate a routing table of each forwarding apparatus and a packet processing information conversion table of each forwarding apparatus. The forwarding apparatus is configured to receive the routing table of the forwarding apparatus and the packet processing information conversion table of the forwarding apparatus, and execute data exchange between the forwarding apparatuses according to the routing table and the packet processing information conversion table.

11 Claims, 7 Drawing Sheets

(56) References Cited

OTHER PUBLICATIONS

Supplementary European Search Report from the Munich Patent Office for Application No. EP 10 84 8675.4-2416 PCT/CN2010/071386 dated Apr. 20, 2012.

Zhang et al., "BPA-A Parallel Shortest Path Algorithm For Cluster-Router", Proceedings of the 18th IASTED International Conference Parallel and Distributed Computing and Systems, Nov. 13-15, 2006, Dallas, TX, USA.

International Search Report for International Application No. PCT/CN20101071386, mailed Jan. 6, 2011 Huawei Technologies C., LTD 4 pgs.

Yang et al., "Forwarding and Control Element Separation (ForCES) Framework Status of this Memo", Network Working Group, Request for Comments 3746, Category: Informational, Apr. 2004.

Pradhan et al., "A Cluster-based, Scalable Router Architecture" Computer Science Department State University of New York at Stony Brook, dated 2000.

Baosheng, W., "Research and Implementation on a New Router Architecture," University of Defense Technology, Changsha, Hunan, P.R. China, 121 pages.

Chinese Search Report received in Application No. 201080003446X, received Jan. 17, 2013, 3 pages.

Zhang, X. et al., "Scalable Router," Department of Computer Science and Technology, Tseinghua University, Beijing, China, Journal of Software, vol. 19, No. 6, Jun. 2008, 13 pages.

Written Opinion of the International Searching Authority, received in International Application No. PCT/CN2010/071386, Applicant: Huawei Technologies Co., Ltd, et al., mailed Jan. 6, 2011, 4 pages.

* cited by examiner

FIG. 10 he present invention relates to the field of communications technologies, and in particular, to a cluster router and a cluster routing method.

CLUSTER ROUTER AND CLUSTER ROUTING METHOD

CROSS-REFERENCE TO RELATED APPLICATIONS

This application is a continuation of International Application No. PCT/CN2010/071386, filed on Mar. 29, 2010, which is hereby incorporated by reference in its entirety.

FIELD OF THE DISCLOSURE

The present invention relates to the field of communications technologies, and in particular, to a cluster router and a cluster routing method.

BACKGROUND

Internet (Internet) traffic is always in a rapid growth, and the growth of the traffic pushes network devices such as routers to continuously develop towards high-capacity. A previous router is of centralized processing, and packet forwarding is performed by one processor, but processing capability of the centralized router is limited. The emergence of a bus type distributed router increases the processing capability of the router, the bus type distributed router has multiple insertion cards, each insertion card has a processor that may process packets, the insertion cards are connected through a bus, an insertion card applies to use the bus when needing to send data to another insertion card, and the bus is dedicated during the period from the time a system agrees to completion of the sending, during which the other insertion cards cannot send data. The processing capability of the bus type distributed router is the total of the processing capability of all the insertion cards, a bandwidth of the bus is the bandwidth of the system. Actual products of the centralized and bus type distributed routers are usually single-frame devices.

The emergence of a switching network enables multiple pairs of insertion cards to communicate with one another at the same time, thus further increasing the capacity of the system. The capacity of the single-frame device is increased greatly through the architecture combining the switching network and the distributed processing, but on the whole, the growth speed of the traffic is higher than the development speed of the single-frame capacity, and the capacity of the single-frame device still cannot satisfy the demand. Therefore, the capacity of a network node needs to be increased through multi-frame or multiple devices.

Figure 1:
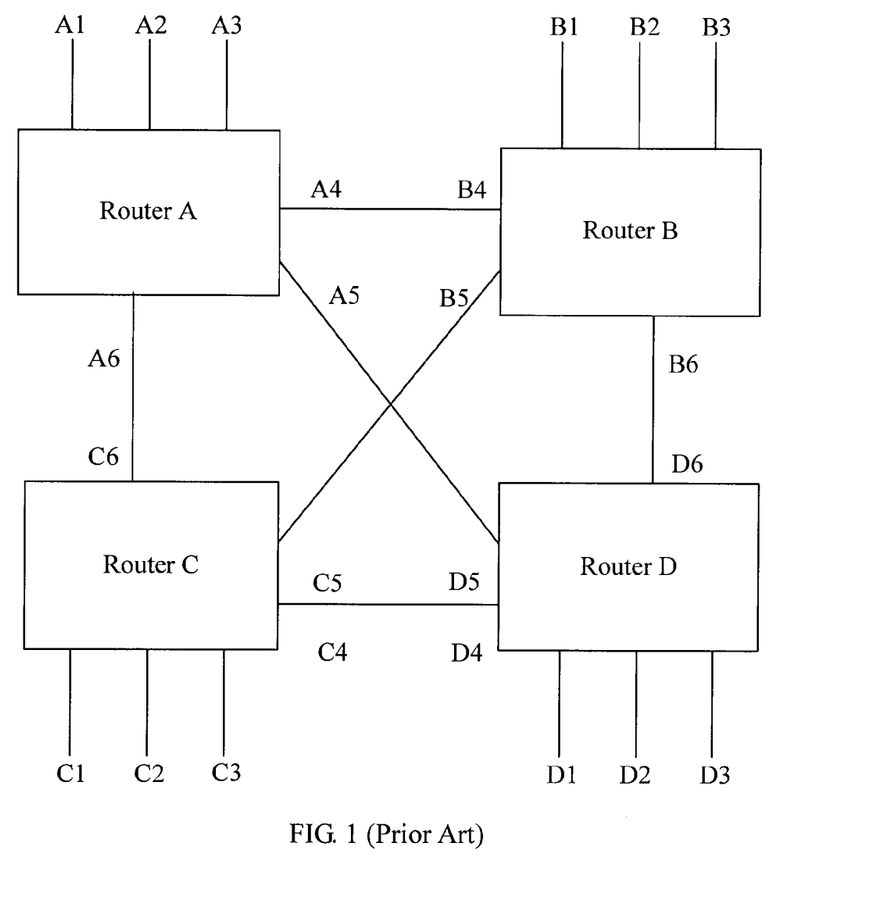
FIG. 1 is a router scheme of interconnecting by using multiple devices in the prior art.

One method to increase the capacity of a router node is networking by using multiple devices, interconnecting the devices by using standard lines, and replacing a single apparatus with a network. FIG. 1 is a router scheme of interconnecting by using multiple devices. As shown in FIG. 1, a node is set up by using four same routers (A, B, C, D), and each router has six standard 10GE interfaces. For example, the six interfaces of the router A are A1, A2, A3, A4, A5, and A6. The interfaces of the four devices are connected for networking, that is, the A4 interface of the router A is connected to a B4 interface of the router B, A5 is connected to an interface D5 of the router D, A6 is connected to an interface C6 of the router C, . . . , each device has three interfaces used for internal interconnecting (such as the interfaces A4, A5, A6 of the router A), the other three interfaces are used to provide a bandwidth to the outside (such as the interface A1, A2, A3 of the router A), so that the four devices each with a capacity of 60 G form a non-blocking network with a capacity of 120 G, which increases the capacity of the node.

The main disadvantages of the scheme of networking by using multiple devices in FIG. 1 are as follows: 1. Multiple devices lead to complexity of the network and a high management cost. 2. A packet needs to undergo packet processing for multiple times when passing through the network, for example, a packet, entering the network through the interface A1 and exiting the network through C1, at least needs to undergo packet processing performed by two routers, A and C, the work is repeated, the cost is high, and the power consumption is high.

Figure 2:
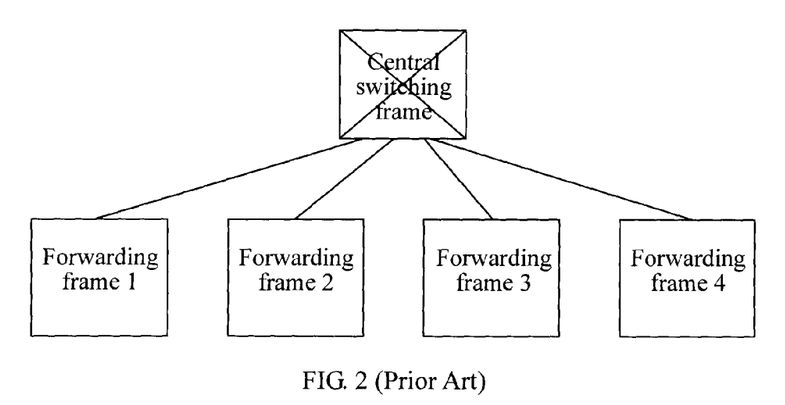
FIG. 2 is a router clustering scheme of a central switching frame type in the prior art.

Another method to increase the capacity of a router node is setting up a cluster router by using a dedicated central switching frame. FIG. 2 is a router clustering scheme of a central switching frame type. As shown in FIG. 2, one or more dedicated central switching frames are connected to multiple forwarding frames by using private interconnection lines, and the forwarding frames are responsible for packet forwarding processing. For example, a forwarding frame 1 receives a packet to perform forwarding processing, and decides to send the packet out through a forwarding frame 3, so that the forwarding frame 1 requests the central switching frame to transmit the packet to the forwarding frame 3, and the central switching frame switches the packet between the forwarding frames according to the request of the forwarding frame.

The disadvantages of the central switching frame type clustering in FIG. 2 are as follows: 1. The system is complex, implementation of a switching network is complex, multi-stage switching is usually required, extension is not flexible, and many devices only have single-stage switching for cost reasons and cannot adopt the clustering manner. 2. The extension capability of the switching network is limited, and the supported number of the forwarding frames and the supported number of line cards are limited, so that the capacity of the node is still limited. 3. The switching network is highly firmwared, which results in poor compatibility, and the switching network cannot be compatible with a conventional forwarding frame when updated and upgraded because an interconnection protocol between the switching frame and the forwarding frame is upgraded, thus failing to protect investments of users.

SUMMARY

Embodiments of the present invention provide a cluster router and a cluster routing method.

According to one aspect, an embodiment of the present invention provides a cluster router, where the cluster router includes at least one control apparatus and at least two forwarding apparatuses. The control apparatus is connected to the forwarding apparatuses, and the forwarding apparatuses are connected with each other. The control apparatus is configured to generate and distribute a routing table of each forwarding apparatus and a packet processing information conversion table of each forwarding apparatus. The packet processing information conversion table includes a corresponding relationship between local frame packet processing information transferred inside the forwarding apparatus and cluster packet processing information transferred between the forwarding apparatuses. The forwarding apparatus is configured to receive the routing table of the forwarding apparatus and the packet processing information conversion table of the forwarding apparatus, which are delivered by the control apparatus; according to the packet processing information conversion table, convert the local frame packet processing information into the cluster packet processing information; carry the cluster packet processing information in a data packet received from the outside and send the data packet received from the outside to another forwarding apparatus; or according to the packet processing information conversion table, convert the cluster packet processing information into the local frame packet processing information; carry the local frame packet processing information in a data packet received from the outside and transfer the data packet received from the outside inside the forwarding apparatus.

According to another aspect, an embodiment of the present invention provides a cluster routing method. The method includes: generating and distributing a routing table of each forwarding apparatus in a cluster router and a packet processing information conversion table of each forwarding apparatus in the cluster router, where the packet processing information conversion table includes a corresponding relationship between local frame packet processing information transferred inside a forwarding apparatus and cluster packet processing information transferred between forwarding apparatuses; according to the packet processing information conversion table, converting the local frame packet processing information into the cluster packet processing information; carrying the cluster packet processing information in a data packet received from the outside and sending the data packet received from the outside to another forwarding apparatus; or according to the packet processing information conversion table, converting the cluster packet processing information into the local frame packet processing information; carrying the local frame packet processing information in a data packet received from the outside and transferring the data packet received from the outside inside the forwarding apparatus.

The forwarding apparatus of the cluster router in the embodiment processes the data packet after receiving an external data packet to obtain forwarding information, and in order to prevent another forwarding apparatus from repeatedly processing the data packet, the forwarding apparatus converts information needed to be repeatedly processed (the local frame packet processing information) into the cluster packet processing information that is transferred between the forwarding apparatuses, encapsulates the cluster packet processing information and the data packet in a link layer frame and transfers the link layer frame to another forwarding apparatus, the another forwarding apparatus converts the cluster packet processing information into the local frame packet processing information that is recognizable to the forwarding apparatus, and in this way, it is not needed that each forwarding apparatus performs repeated forwarding processing on the data packet. By adopting the cluster routing method in the embodiment, the entire cluster router only needs to perform the processing once when receiving the data packet, and it is not needed that each forwarding apparatus performs repeated forwarding processing on the data packet, and the entire cluster router is equivalent to one node to the outside, thus solving the problem that an existing cluster router needs to perform forwarding processing on the data packet for multiple times.

DETAILED DESCRIPTION OF THE EMBODIMENTS

In order to make the objectives, technical solutions, and advantages of the embodiments of the present invention more clearly, the technical solutions according to the embodiments of the present invention are clearly and completely described in the following with reference to accompanying drawings in the embodiments of the present invention. Apparently, the embodiments in the following description are merely part of rather than all of the embodiments of the present invention. All other embodiments obtained by persons of ordinary skill in the art based on the embodiments of the present invention without creative efforts shall fall within the protection scope of the present invention.

The embodiments of the present invention provide a cluster router and a cluster routing method to overcome disadvantages of an existing networking scheme and central switching frame type clustering scheme, and may obtain the following beneficial effects: a) Using standard lines for interconnection has flexible extensibility and compatibility and is not limited by extension capability of a switching network, and the switching network may still be compatible with a conventional device when updated and upgraded. b) A single network view is provided: Although formed by multiple physical frames, a node is viewed as a device from the perspective of management, thus simplifying the management. c) A one-hop forwarding manner is provided: A dedicated interconnection line card is employed; when a packet passes through the node, forwarding processing needs to be performed only once to obtain forwarding information when an external data packet is received, which is not like the existing networking scheme in which each forwarding frame needs to perform repeated forwarding processing on a data packet.

Figure 3:
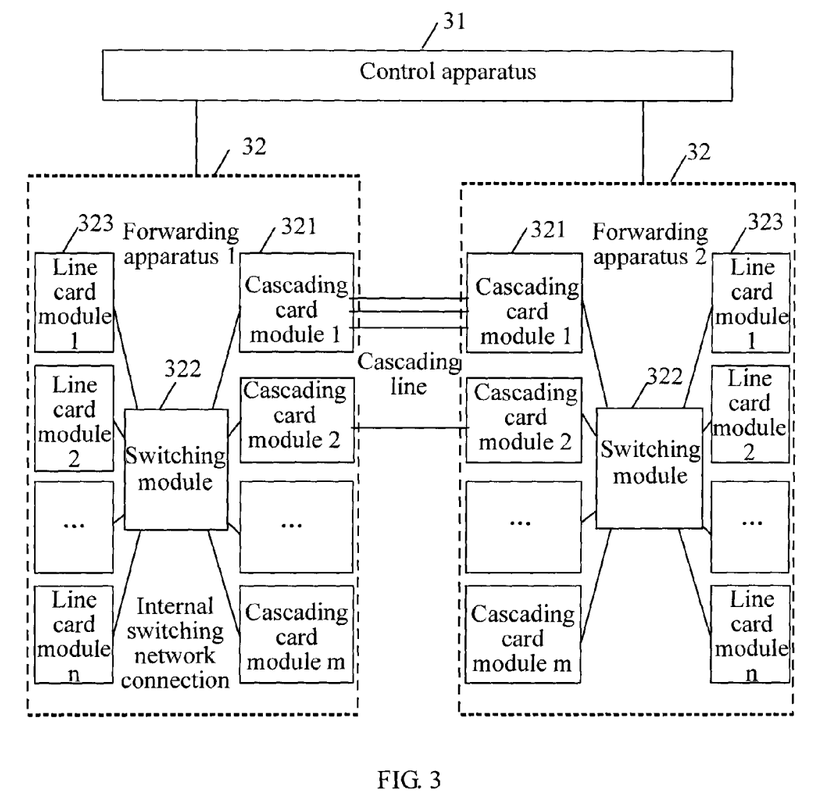
FIG. 3 is a principle block diagram of a cluster router according to an embodiment of the present invention.

FIG. 3 is a principle block diagram of a cluster router according to this embodiment. As shown in FIG. 3, the cluster router of this embodiment includes at least one control apparatus 31 and at least two forwarding apparatuses 32, the control apparatus 31 is connected to the forwarding apparatuses 32, and the forwarding apparatuses 32 are connected with each other. Optionally, a dedicated management control channel or a public data channel is employed between the control apparatus 31 and the forwarding apparatuses 32 of this embodiment to transmit control information.

The control apparatus 31 is configured to generate and distribute a routing table of each forwarding apparatus 32 and a packet processing information conversion table of each forwarding apparatus 32, and the packet processing information conversion table includes a corresponding relationship between local frame packet processing information transferred inside the forwarding apparatus 32 and cluster packet processing information transferred between the forwarding apparatuses 32. The forwarding apparatus 32 is configured to receive the routing table of the forwarding apparatus and the packet processing information conversion table of the forwarding apparatus, which are delivered by the control apparatus 31; convert the local frame packet processing information into the cluster packet processing information according to the packet processing information conversion table; carry the cluster packet processing information in a data packet received from the outside, and send the data packet received from the outside to another forwarding apparatus; or convert the cluster packet processing information into the local frame packet processing information according to the packet processing information conversion table; carry the local frame packet processing information in the data packet received from the outside, and transfer the data packet received from the outside inside the forwarding apparatus. The method that the control apparatus 31 generates the routing table and the packet processing information conversion table is described in detail through an example in the following.

Optionally, the control apparatus 31 of this embodiment generates a corresponding routing table and packet processing information conversion table for each forwarding apparatus 32, and delivers the generated tables to multiple forwarding apparatuses 32. A delivery manner may be unified delivery to corresponding forwarding apparatuses 32 when the control apparatus 31 is started. Optionally, the control apparatus 31 may periodically detect whether the content of a table entry is updated, and actively delivers an updated table to the forwarding apparatus 32.

As shown in FIG. 3, optionally, the forwarding apparatus 32 of this embodiment includes: a cascading card module 321 and a switching module 322. The switching module 322 is connected to the cascading card module 321; the forwarding apparatuses 32 are interconnected by the cascading card module 321 through cascading lines. A cascading line is configured to transfer a data packet between the forwarding apparatuses 32, and is also configured to transfer control information. The cascading line is a standard line, such as 10GE and 10G POS, which may improve the compatibility. Even if switching modules in the two forwarding apparatuses are different, the clustering manner of this embodiment may also be adopted.

The cascading card module 321 is configured to receive and store the packet processing information conversion table of the forwarding apparatus 32, implement mutual conversion between the local frame packet processing information and the cluster packet processing information according to the packet processing information conversion table, and implement data exchange with the cascading line. The switching module 322 is configured to receive and store the routing table of the forwarding apparatus 32 and the local frame packet processing information converted by the cascading card module 321, and perform data exchange between the cascading card modules 321 according to the received routing table and local frame packet processing information.

As shown in FIG. 3, optionally, the forwarding apparatus 32 of this embodiment further includes: a line card module 323 connected to the switching module 322, and configured to receive a data packet from the outside of the cluster router and process the received data packet to generate local frame packet processing information. The switching module 322 is further configured to execute, according to the received routing table and the local frame packet processing information, data exchange between the line card modules 323 and between the line card module 323 and the cascading card module 321.

In summary, the forwarding apparatus 32 of this embodiment includes at least one cascading card module 321, at least one switching module 322, and may further include multiple line card modules 323. The switching module 322 is responsible for data exchange between the line card modules 323, between the cascading card modules 321, and between the line card module 323 and the cascading card module 321 in the forwarding apparatus 32. The line card module 323 is responsible for packet processing such as an external interface, data receiving and sending, and forwarding. The cascading card module 321 is responsible for providing a cascading line interface, and connecting each forwarding apparatus 32 of the cluster router.

Figure 4:
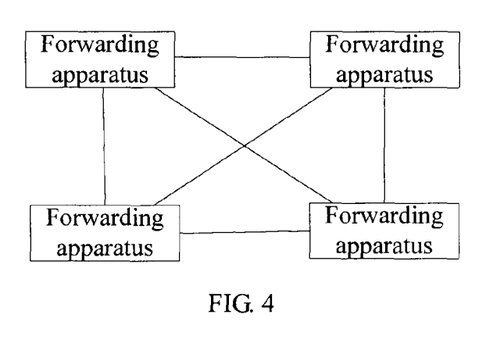
FIG. 4 is a first schematic connection diagram of a cluster router according to an embodiment of the present invention.
Figure 5:
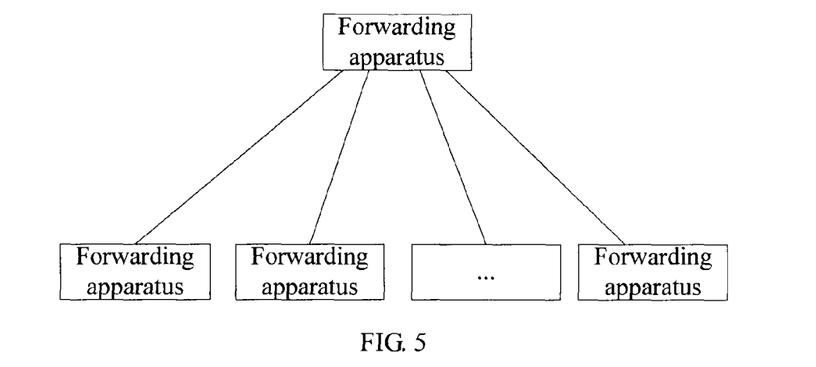
FIG. 5 is a second schematic connection diagram of a cluster router according to an embodiment of the present invention.
Figure 6:
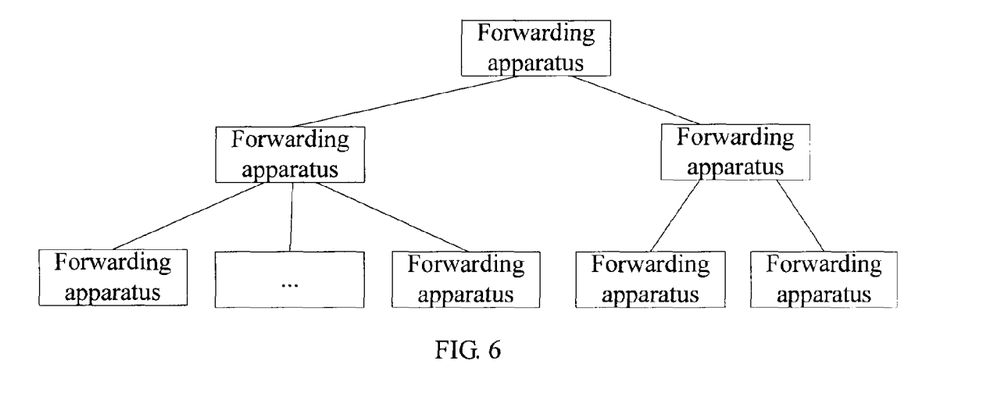
FIG. 6 is a third schematic connection diagram of a cluster router according to an embodiment of the present invention.

FIG. 3 is only a schematic connection diagram of a forwarding apparatus, the forwarding apparatus may also be multiple, a connection manner is not limited to the manner in FIG. 3, and manners such as a peer mesh shape or a semi-mesh shape, a star type, a tree type, and a hierarchical type may also be adopted, as shown in FIGS. 4 to 6. FIGS. 4 to 6 omit a specific architecture of a forwarding apparatus and a control module of a forwarding apparatus, and only show a schematic connection topology diagram of the forwarding apparatus. FIG. 4 is multi-frame peer mesh shape or semi-mesh shape connection, FIG. 5 is star type connection, and FIG. 6 is tree type or hierarchical type connection. In the connection manners of FIGS. 4 to 6, the forwarding apparatus in the central position or in the high level position may have no line card module, and only have a cascading card module and a switching module. The forwarding apparatuses may be connected through cascading card modules, and may also be partially connected through the cascading card modules, and partially connected through the line card modules.

"Uplink" in this embodiment refers to a flow direction in which a data packet is received, and the data packet is transmitted to the switching module through the line card module or the cascading card module, and "downlink" refers to the flow direction in which a data packet is sent to another forwarding apparatus from the switching module through the line card module or the cascading card module. A packet processing information conversion table of this embodiment may be further divided into a downlink packet processing information conversion table (Table 1) and an uplink packet processing information conversion table (Table 2).

The downlink packet processing information conversion table is a table for converting the local frame packet processing information into the cluster packet processing information, in which a search keyword is the local frame packet processing information, and a search result is the cluster packet processing information. The uplink packet processing information conversion table is a table for converting the cluster packet processing information into the local frame packet processing information, in which a keyword is the cluster packet processing information, and a search result is the local frame packet processing information. The cluster packet processing information is an information format transferred between forwarding modules, the local frame packet processing information is a format that is recognizable to a forwarding module, that is, an information format transferred inside the forwarding module. The forwarding module needs to implement, according to the packet processing information conversion table, format conversion between the cluster packet processing information and the local frame packet processing information.

Optionally, the downlink packet processing information conversion table of this embodiment may further include inter-frame distribution information, which is to be used when the data packet is sent to another forwarding apparatus in the cluster router from this forwarding apparatus through the cascading card module. The inter-frame distribution information may include information such as a forwarding apparatus to which the data packet is sent, a cascading line interface from which the data packet is sent, and traffic management information and encapsulation information when a cascading line interface module sends the data packet.

TABLE 1

Downlink packet processing information conversion table

| Keyword (Local Frame Packet Processing Information) | Cluster Packet Processing Information | Inter-frame Distribution Information |
|---|---|---|
| Local frame packet processing information 1 | Cluster packet processing information 1 | Inter-frame distribution information 1 |
| Local frame packet processing information 2 | Cluster packet processing information 2 | Inter-frame distribution information 2 |
| ... | ... | ... |

TABLE 2

Uplink packet processing information conversion table

| Keyword (Cluster Packet Processing Information) | Local Frame Packet Processing Information |
|---|---|
| Cluster packet processing information 1 | Local frame packet processing information 1 |
| Cluster packet processing information 2 | Local frame packet processing information 2 |
| ... | ... |

Figure 7:
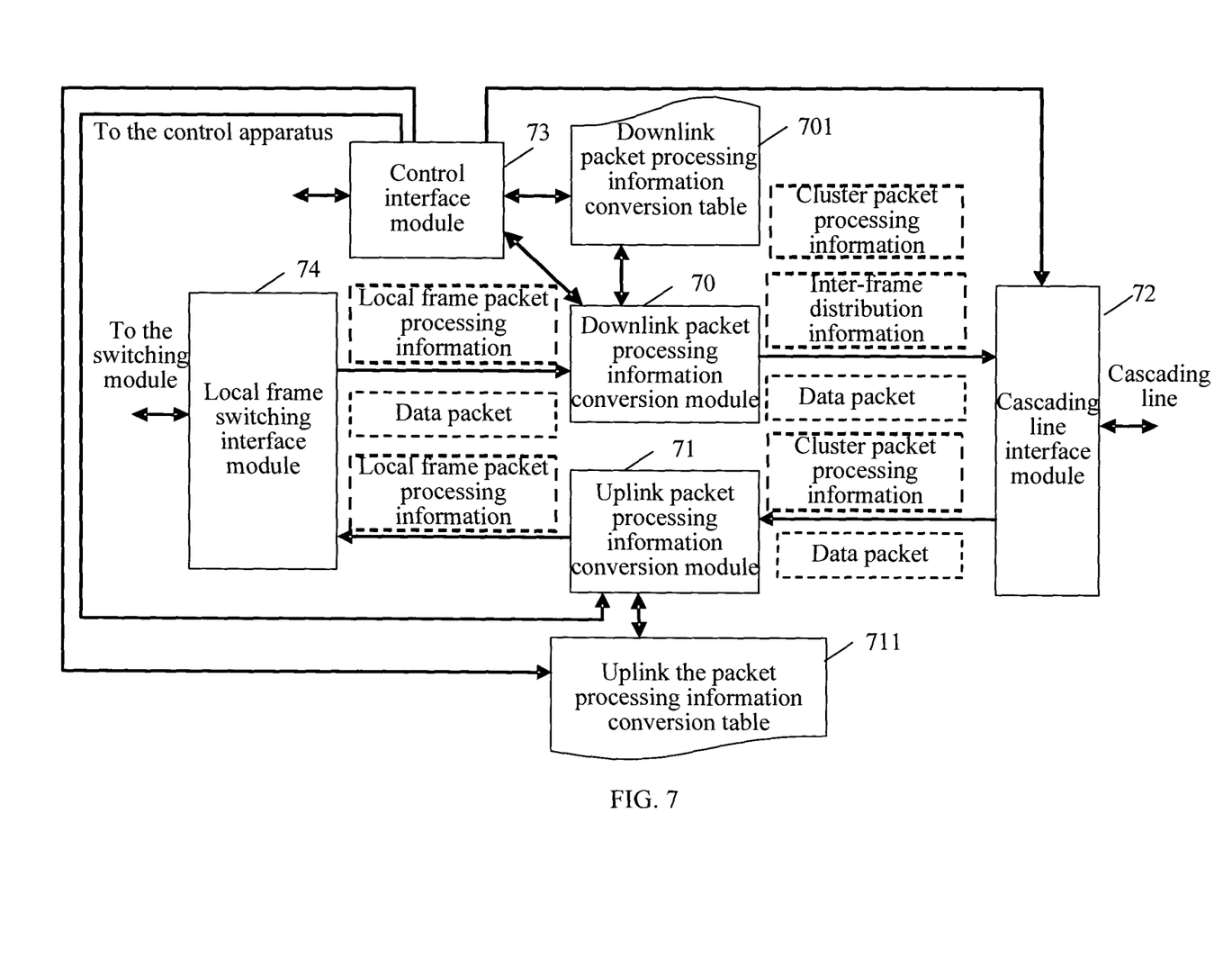
FIG. 7 is a detailed functional block diagram of a cascading card module 321 according to an embodiment of the present invention.

FIG. 7 is a detailed functional block diagram of a cascading card module 321 according to this embodiment. As shown in FIG. 7, the cascading card module 321 includes: a downlink packet processing information conversion module 70, configured to convert, according to a packet processing information conversion table (a downlink packet processing information conversion table 701), local frame packet processing information carried in a data packet received from a switching module 322 into cluster packet processing information; an uplink packet processing information conversion module 71, configured to convert, according to a packet processing information conversion table (an uplink packet processing information conversion table 711), cluster packet processing information carried in a data packet received from a cascading line into local frame packet processing information; and a cascading line interface module 72, configured to implement data exchange with the cascading line. The cascading line interface of this embodiment is a standard line interface, such as 10GE and 10G POS. A cascading card may have one or more cascading line interfaces, and two forwarding frames may be interconnected through multiple pairs of cascading cards.

Optionally, the packet processing information conversion table (Table 1) further includes: inter-frame distribution information; and the cascading line interface module 72 is further configured to determine, according to the inter-frame distribution information, a sending port of the data packet and a target forwarding apparatus of the sending. Optionally, the cascading card module 321 further includes: a control interface module 73, configured to receive a command of the control apparatus, and update the packet processing information conversion table and the routing table of this forwarding apparatus. For example: When the control apparatus 31 finds that the routing table or the packet processing information conversion table is updated, the control apparatus 31 actively sends an updated table to the control interface module 73 through an update command, and the control interface module 73 updates, according to the updated table included in the update command, the packet processing information conversion table and the routing table in the forwarding apparatus.

A working principle of the cascading card module of the forwarding apparatus of this embodiment is described in detail in the following.

A data packet transmitted in this embodiment includes: an IP packet, an MPLS packet or another user data packet. The local frame packet processing information of this embodiment includes, but is not limited to, information for controlling packet processing between modules in the forwarding apparatus, a packet forwarding decision (such as a target slot number and an outlet interface number), an QoS decision (such as a flow identification and a QoS type). The local frame packet processing information is generated when the line card module processes an external data packet, and the generated local frame packet processing information is carried in the data packet. The data packet and corresponding local frame packet processing information are transferred between each module in this forwarding apparatus to control a subsequent module to process the packet. Due to hardware limitations, the local frame packet processing information can only be recognized by the switching module, the cascading card module, and line card module of this forwarding apparatus, and cannot be recognized by another forwarding apparatus. Therefore, the local frame packet processing information needs to be converted into the cluster packet processing information transferred between the forwarding apparatuses, and then each forwarding apparatus converts, according to its packet processing information conversion table, the cluster packet processing information into the local frame packet processing information that is recognizable to the forwarding apparatus.

The conversion into the cluster packet processing information may prevent traffic classification from being executed repeatedly after the data packet enters another forwarding apparatus, that is, the information such as the forwarding decision and the QoS decision are sent together with an IP packet to another forwarding apparatus to be passed by. A corresponding relationship between the local frame packet processing information and the cluster packet processing information is generated by the control apparatus, stored in the uplink packet processing information conversion table of the cascading card module and the downlink packet processing information conversion table of the cascading card module, and used by the uplink packet processing information conversion module and the downlink packet processing information conversion module. The cluster packet processing information may be just an identification of a scalar or structured data.

The downlink packet processing information conversion module 70 of the cascading card module of this embodiment is specifically configured to receive a downlink data packet and local frame packet processing information that are from the switching module of this forwarding apparatus, look into the downlink packet processing information conversion table, convert the local frame packet processing information into the cluster packet processing information that is recognizable to another forwarding frame cascading card, obtain inter-frame distribution information, and then give the data packet and the information to the cascading line interface module for processing.

The uplink packet processing information conversion module 71 of the cascading card module of this embodiment is specifically configured to receive an uplink data packet from the cascading line interface module, where the uplink data packet carries the cluster packet processing information; and convert the cluster packet processing information into the local frame packet processing information that is recognizable to the switching module, a switching interface module, and the cascading card module of this forwarding apparatus.

The control interface module 73 of the cascading card module of this embodiment is specifically configured to receive a command from the control module to update the uplink packet processing information conversion table, the downlink packet processing information conversion table and the routing table.

A local frame switching interface module 74 of the cascading card module of this embodiment is responsible for a switching module interface and traffic management of this forwarding apparatus.

The cascading line interface module 72 of the cascading card module of this embodiment is responsible for sending and receiving of a data packet from the cascading card module to the cascading line, including encapsulating the cluster packet processing information and the data packet together to form a link layer frame, and the cascading line interface module may also include a function of traffic management.

Figure 8:
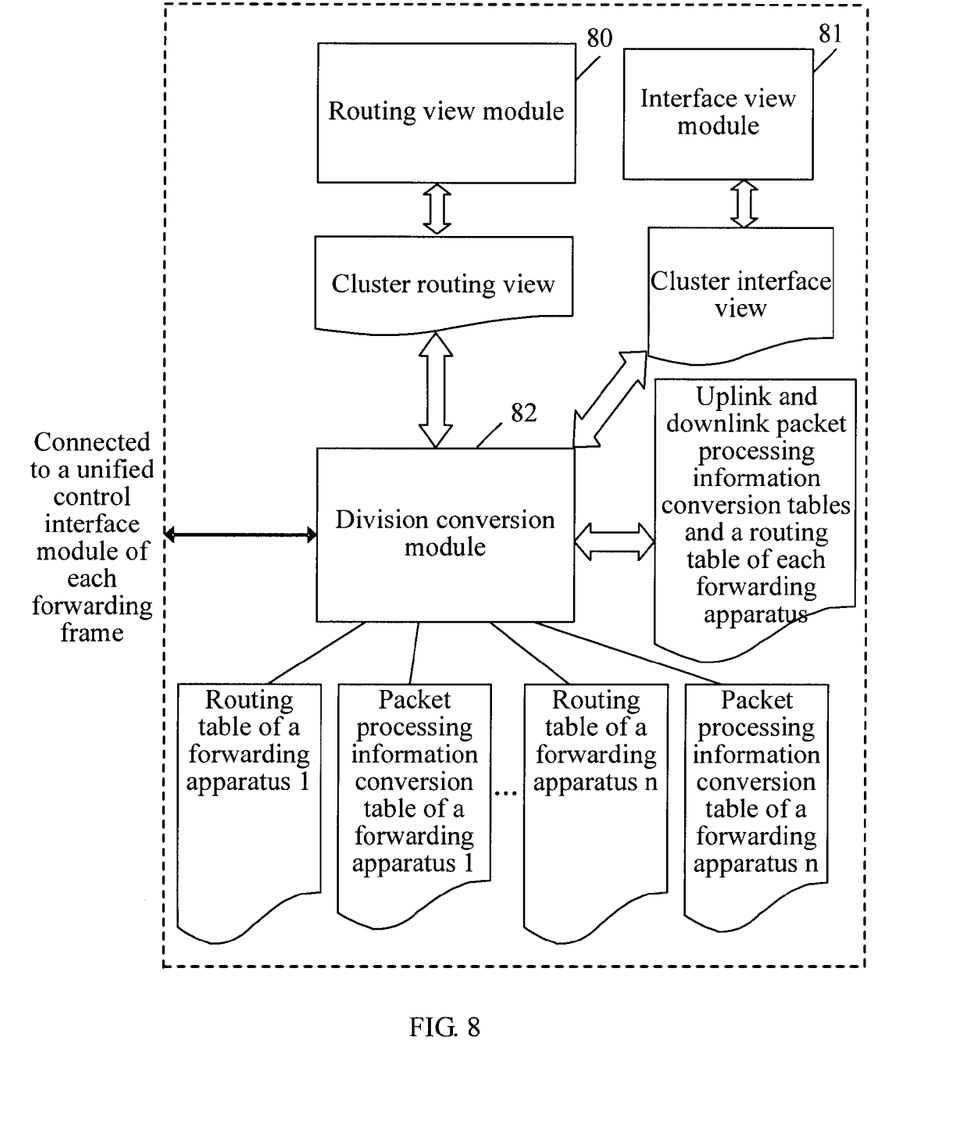
FIG. 8 is a detailed functional block diagram of a control apparatus 31 according to an embodiment of the present invention.

FIG. 8 is a detailed functional block diagram of a control apparatus 31 according to this embodiment. A function of the control apparatus 31 is building and maintaining uplink and downlink packet processing information conversion tables of each forwarding apparatus. Another function of the control apparatus 31 is dividing a unified routing view learned by a cluster router into routing that is recognizable to each forwarding apparatus, disassembling a cluster interface view into interfaces that are recognizable to each forwarding apparatus, and integrating the information into a routing table of each forwarding apparatus.

As shown in FIG. 8, the control apparatus 31 includes: a routing view module 80, configured to obtain a cluster routing view of a cluster router; an interface view module 81, configured to obtain a cluster interface view of the cluster router; and a division conversion module 82, configured to divide the cluster routing view and the cluster interface view to generate a routing table and a packet processing information conversion table that correspond to each forwarding apparatus, and distribute the routing table and the packet processing information conversion table to each forwarding apparatus The control apparatus 31 of this embodiment is responsible for unified controlling and managing of the entire cluster router, so that the cluster router formed by multiple forwarding apparatuses is presented as a single node, for example, presented as a routing node with respect to a routing protocol, and presented as a single device with respect to network management. The control apparatus may be located inside a forwarding apparatus, or be borne by multiple forwarding apparatuses, and may also be an independent control apparatus. Communication between the control apparatus and the forwarding apparatus may employ a dedicated management control channel, and employ an out-band manner for transmission; or share a channel with a data packet and employ an in-band manner for transmission.

Figure 9:
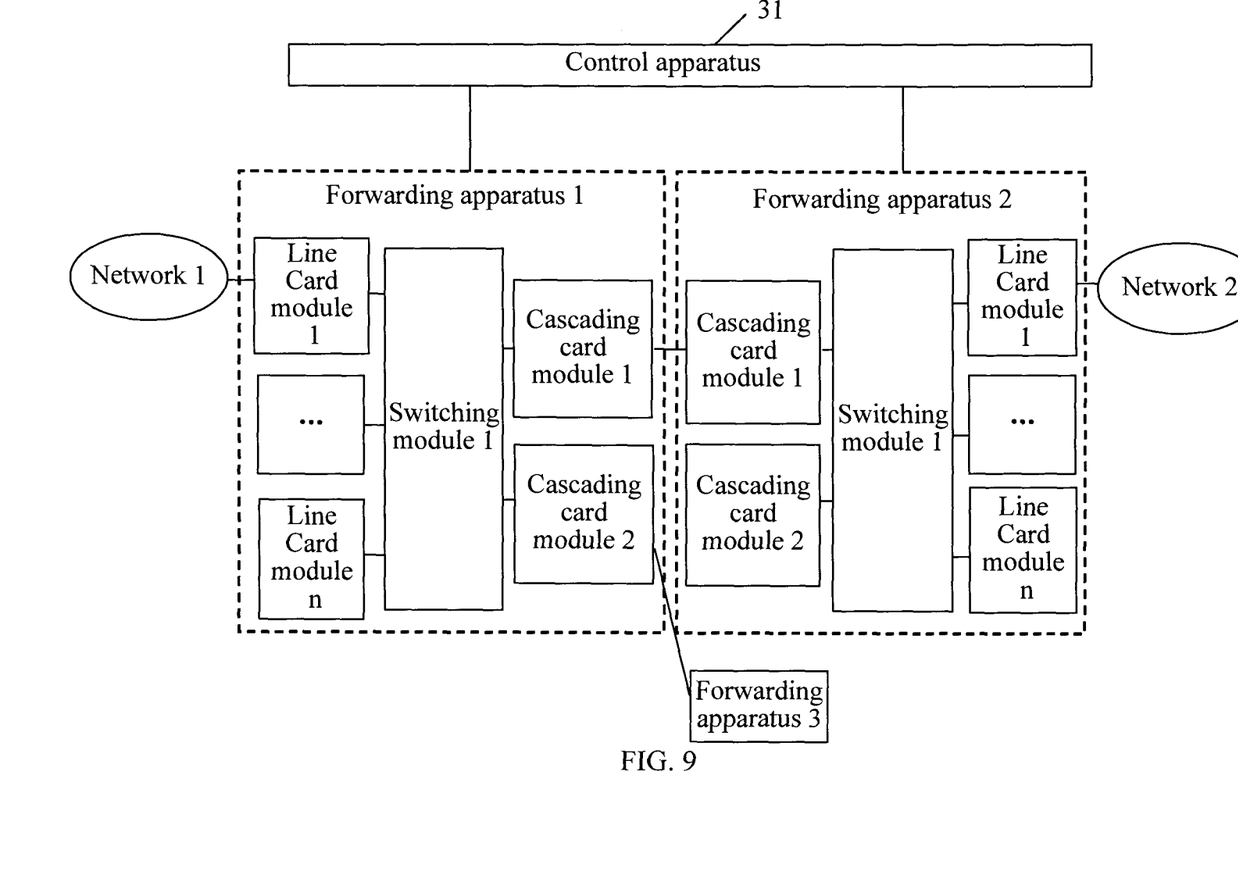
FIG. 9 is a principle block diagram of an actual cluster router according to an embodiment of the present invention.

A process, in which the cluster router of this embodiment is employed to perform data exchange, is described through an example in the following. FIG. 9 is a principle block diagram of an actual cluster router. As shown in FIG. 9, the cluster router has three forwarding apparatuses (a specific structure of a forwarding apparatus 3 is not drawn) and a control apparatus 31. A network 1 is connected to a line card module 1 of a forwarding apparatus 1 through a subscriber line, a network 2 is connected to a line card module 1 of a forwarding apparatus 2 through a subscriber line, the forwarding apparatus 1 and the forwarding apparatus 2 are connected through a pair of cascading card modules. The line card module and the cascading card module of this embodiment further include multiple interfaces (not shown in the figure).

A cluster routing view learned by the control apparatus 31 of this embodiment is as shown in Table 3.

TABLE 3

| Cluster routing table | | |
| --- | --- | --- |
| Destination | Outlet Interface | Next Hop |
| Network 1 | Interface 1 of a line card 1 of a forwarding apparatus 1 | xxx |
| Network 2 | Interface 1 of a line card 1 of a forwarding apparatus 2 | xxx |
| . . . | . . . | . . . |

The control apparatus needs to divide Table 3 into routing tables that are recognizable to each forwarding apparatus, where the routing tables are used by the line card module, and the routing tables after the division are as shown in Table 4 and Table 5:

TABLE 4

| Routing table of a forwarding apparatus 1 | | |
| --- | --- | --- |
| Destination | Outlet Interface | Next Hop |
| Network 1 | Interface 1 of a line card 1 | xxx |
| Network 2 | Interface 1 of a cascading card 1 | xxx |
| . . . | . . . | . . . |

TABLE 5

| Routing table of a forwarding apparatus 2 | | |
| --- | --- | --- |
| Destination | Outlet Interface | Next Hop |
| Network 1 | Interface 1 of a cascading card 1 | xxx |
| Network 2 | Interface 1 of a line card 1 | xxx |
| . . . | . . . | . . . |

The control apparatus 31 also needs to generate and maintain an uplink packet processing information conversion table and a downlink packet processing information conversion table, which are used by the cascading card module, and are as shown in Table 1 and Table 2. Similar to the generating method of the routing table, in this embodiment, the control module pre-stores a corresponding relationship table of local frame packet processing information and cluster packet processing information of all the forwarding modules of the cluster router, and divide, according to an interface view of the cluster router, the complete table into the uplink packet processing information conversion table and the downlink packet processing information conversion table that correspond to each forwarding apparatus.

The conversion from the local frame packet processing information to the cluster packet processing information may include: converting from in-frame routing to inter-frame routing, and converting from in-frame QoS to inter-frame QoS. The keywords in Table 1 and Table 2 may be a conversion index, the forwarding apparatus 32 searches for, according to the conversion index, a corresponding conversion table entry in the packet processing information conversion table, converts information needed to be repeatedly processed (the local frame packet processing information) into the cluster packet processing information that is recognizable to another forwarding apparatus, encapsulates the cluster packet processing information and a data packet in a link layer frame and transfers the link layer frame to another forwarding apparatus, the another forwarding apparatus converts the cluster packet processing information into the local frame packet processing information that is recognizable to the forwarding apparatus, and in this way, it is not needed that each forwarding apparatus processes the data packet.

Optionally, the cluster router of this embodiment may act as a forwarding apparatus of a large cluster, that is, multiple cluster routers of this embodiment may form a large cluster through the cascading card cluster manner.

The cluster router of this embodiment performs multi-frame extension by using the cascading card, the control apparatus converts the single cluster routing view and the cluster interface view into packet processing information that is recognizable to each forwarding apparatus, each forwarding apparatus is connected by the cascading card module, the cascading card module converts the repeatedly processed information to be omitted (the local frame packet processing information) into the cluster packet processing information, encapsulates the cluster packet processing information and the data packet in a link layer frame and transfers the link layer frame to another forwarding apparatus, the another forwarding apparatus converts the cluster processing information into information that is recognizable to the forwarding apparatus, and the cluster router of this embodiment controls the multiple cascaded forwarding apparatuses through the control apparatus to implement data exchange of the cluster router.

The cluster router of the embodiment of the present invention may bring the following beneficial effects: 1) A clustered node view: The cluster router of this embodiment has a control module, so that the entire cluster is presented as a single node view to the outside. 2) Flexible extension: By converting the local frame packet processing information into the cluster packet processing information, the cluster router of this embodiment enables the node to be flexibly extended, and for multiple devices which do not support cluster or devices with limited cluster capability, the node may be extended to increase the capacity of the node by adding the control apparatus 31 and by using a manner of cascading with the cascading card. 3) Low cost: In this embodiment, the cascading card is employed so that only the conversion of the local frame packet processing information and the cluster packet processing information is required to be performed, which is simpler than forwarding, and the cost is low. Connecting through a common line card may have the problem of multiple times of forwarding and the cost is high. The cluster router of this embodiment may be used in all IP packet processing systems to improve the node extending capability, such as a layer 3 switch, a firewall, and a GGSN.

Figure 10:
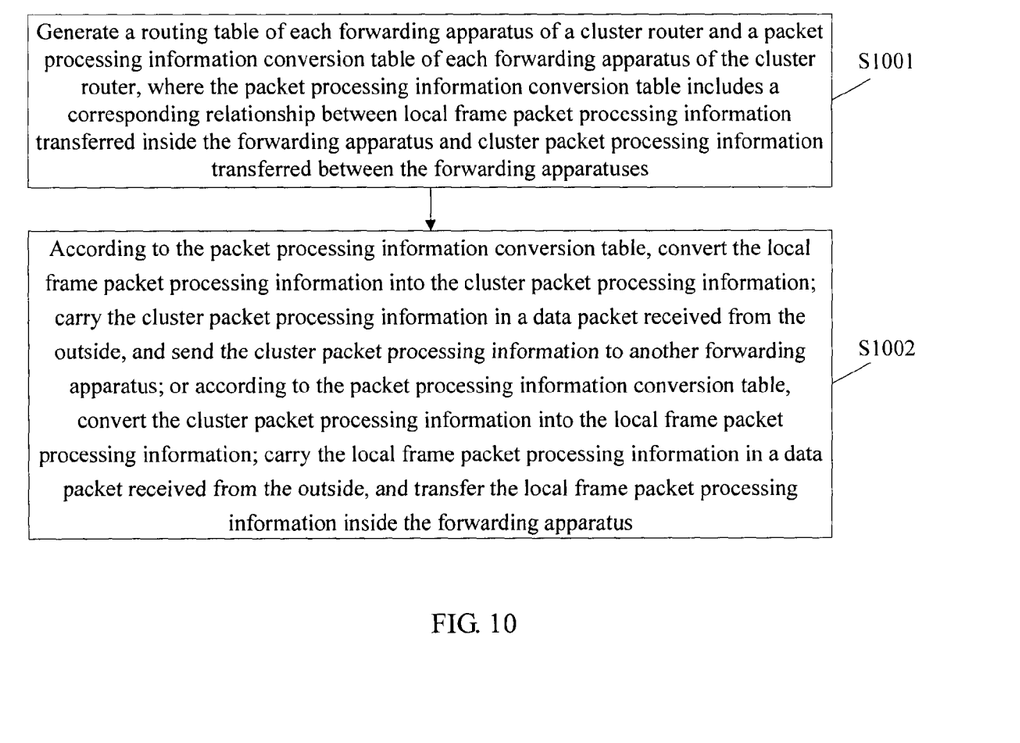
FIG. 10 is a flow chart of a cluster routing method according to an embodiment of the present invention.

An embodiment further provides a cluster routing method, and FIG. 10 is a flow chart of the cluster routing method according to the embodiment. As shown in FIG. 10, the method includes:

S1001: Generate and distribute a routing table of each forwarding apparatus of a cluster router and a packet processing information conversion table of each forwarding apparatus of the cluster router, where the packet processing information conversion table includes a corresponding relationship between local frame packet processing information transferred inside the forwarding apparatus and cluster packet processing information transferred between the forwarding apparatuses.

Optionally, S1001 may include: obtaining a cluster routing view of the cluster router; obtaining a cluster interface view of the cluster router; dividing the cluster routing view and the cluster interface view, generating a routing table and a packet processing information conversion table that correspond to each forwarding apparatus, and distributing the routing table and the packet processing information conversion table to each forwarding apparatus.

Optionally, S1001 further includes: updating the packet processing information conversion table and the routing table.

S1002: According to the packet processing information conversion table, convert the local frame packet processing information into the cluster packet processing information; carry the cluster packet processing information in a data packet received from the outside and send the data packet received from the outside to another forwarding apparatus; or according to the packet processing information conversion table, convert the cluster packet processing information into the local frame packet processing information; carry the local frame packet processing information in a data packet received from the outside, and transfer the data packet received from the outside inside the forwarding apparatus.

Optionally, the packet processing information conversion table further includes: inter-frame distribution information; S1002 further includes: according to the inter-frame distribution information, determining a sending port and a destination of sending of the data packet.

Optionally, S1002 further includes: receiving a data packet from the outside of the cluster router, and processing the received data packet to generate the local frame packet processing information.

In the cluster routing method of this embodiment, the forwarding apparatus of the cluster router obtains forwarding information after receiving an external data packet, and in order to prevent another forwarding apparatus from repeatedly processing the data packet, the forwarding apparatus converts information needed to be repeatedly processed (the local frame packet processing information) into the cluster packet processing information that is recognizable to another forwarding apparatus, encapsulates the cluster packet processing information and the data packet in a link layer frame and transfers the link layer frame to another forwarding apparatus, and the another forwarding apparatus converts the cluster packet processing information into the local frame packet processing information that is recognizable to the forwarding apparatus. By adopting the method, the entire cluster router only needs to perform the processing once when receiving the data packet, and it is not needed that each forwarding apparatus performs repeated forwarding processing on the data packet, and the entire cluster router is equivalent to one node to the outside, thus solving the problem that an existing cluster router needs to perform forwarding processing on the data packet for multiple times.

Persons of ordinary skill in the art should understand that all or part of the steps of the foregoing method embodiments may be implemented by a program instructing relevant hardware. The program may be stored in a computer readable storage medium. When the program is executed, the steps of the foregoing method embodiments are executed. The storage medium includes any medium that may store program codes, such as a ROM, a RAM, a magnetic disk, or an optical disk.

Finally, it should be noted that the foregoing embodiments are merely provided for describing the technical solutions according to the embodiments of the present invention, but not intended to limit the technical solutions according to the embodiments of the present invention. Persons of ordinary skill in the art should understand that: Modifications may still be made to the technical solutions described in the embodiments, or equivalent replacements may still be made to part of technical features in the technical solutions; however, these modifications or replacements do not make the nature of the corresponding technical solutions depart from the spirit and scope of the technical solutions according to the embodiments of the present invention.

What is claimed is:

1. A cluster router, comprising:

at least one control apparatus and at least two forwarding apparatuses, wherein:

the at least two forwarding apparatuses comprise a first forwarding apparatus and a second forwarding apparatus;

the control apparatus is connected to the at least two forwarding apparatuses, and the at least two forwarding apparatuses are connected with each other;

the control apparatus is configured to generate and distribute a routing table of each forwarding apparatus and a packet processing information conversion table of each forwarding apparatus, and the packet processing information conversion table comprises a corresponding relationship between local frame packet processing information and cluster packet processing information; and the first forwarding apparatus is configured to: receive the routing table of the first forwarding apparatus and the packet processing information conversion table of the first forwarding apparatus comprising a corresponding relationship between local frame packet processing information of the first forwarding apparatus and cluster packet processing information of the first forwarding apparatus, which are delivered by the control apparatus; according to the packet processing information conversion table of the first forwarding apparatus, convert the local frame packet processing information of the first forwarding apparatus into the cluster packet processing information of the first forwarding apparatus; carry the cluster packet processing information of the first forwarding apparatus in a first data packet and send the first data packet to the second forwarding apparatus; or according to the packet processing information conversion table, convert the cluster packet processing information of the first forwarding apparatus into the local frame packet processing information of the first forwarding apparatus; carry the local frame packet processing information of the first forwarding apparatus in a second data packet and transfer the second data packet inside the forwarding apparatus;

the first forwarding apparatus comprises a cascading card module and a switching module, the switching module being connected to the cascading card module;

the cascading card module is configured to connect the first forwarding apparatus with the second forwarding apparatus through a cascading line, to receive and store the packet processing information conversion table of the first forwarding apparatus, according to the packet processing information conversion table of the first forwarding apparatus, to implement mutual conversion between the local frame packet processing information of the first forwarding apparatus and the cluster packet processing information of the first forwarding apparatus, and to implement data exchange with the cascading line;

the switching module is configured to receive and store the routing table of the first forwarding apparatus and the local frame packet processing information of the first forwarding apparatus converted by the cascading card module and, according to the routing table and the local frame packet processing information of the first forwarding apparatus, to perform data exchange between the cascading card modules;

the first forwarding apparatus further comprises a line card module connected to the switching module;

the line card module is configured to receive an outside data packet from outside of the cluster router and to process the received outside data packet to generate the local frame packet processing information of the first forwarding apparatus; and the switching module is further configured to execute, according to the routing table and the local frame packet processing information of the first forwarding apparatus, data exchange between the line card module and one or more other line card modules or between the line card module and the cascading card module.

2. The cluster router according to claim 1, wherein the cascading card module comprises:

a downlink packet processing information conversion module, configured to convert, according to the packet processing information conversion table of the first forwarding apparatus, the local frame packet processing information carried of the first forwarding apparatus in a downlink data packet received from the switching module into the cluster packet processing information of the first forwarding apparatus;

an uplink packet processing information conversion module, configured to convert, according to the packet processing information conversion table of the first forwarding apparatus, the cluster packet processing information carried of the first forwarding apparatus in an uplink data packet received from the cascading line into the local frame packet processing information of the first forwarding apparatus; and a cascading line interface module, configured to implement data exchange with the cascading line.

3. The cluster router according to claim 1, wherein:

the packet processing information conversion table of the first forwarding apparatus further comprises inter-frame distribution information; and the cascading line interface module is further configured to determine, according to the inter-frame distribution information, a sending port of the uplink data packet or the downlink data packet and determine a destination forwarding apparatus.

4. The cluster router according to claim 1, wherein the cascading card module further comprises:
a control interface module, configured to receive a command of the control apparatus and update the packet processing information conversion table of the first forwarding apparatus.

5. The cluster router according to claim 1, wherein the control apparatus comprises:
a routing view module, configured to obtain a cluster routing view of the cluster router;
an interface view module, configured to obtain a cluster interface view of the cluster router; and
a division conversion module, configured to divide the cluster routing view and the cluster interface view, generate a routing table and a packet processing information conversion table that correspond to each forwarding apparatus, and distribute the routing table and the packet processing information conversion table to each forwarding apparatus.

6. The cluster router according to claim 1, wherein between the control apparatus and the at least two forwarding apparatuses, a dedicated management control channel or a public data channel is employed to transmit control information.

7. A cluster routing method, comprising:
generating and distributing a routing table of each forwarding apparatus in a cluster router and a packet processing information conversion table of each forwarding apparatus in the cluster router, wherein the packet processing information conversion table comprises a corresponding relationship between local frame packet processing information and cluster packet processing information;
converting the local frame packet processing information into the cluster packet processing information according to the packet processing information conversion table; carrying the cluster packet processing information in a data packet and delivering the data packet to another forwarding apparatus; or according to the packet processing information conversion table, converting the cluster packet processing information into the local frame packet processing information; carrying the local frame packet processing information in a data packet and transferring the data packet inside the forwarding apparatus; and
before the converting the local frame packet processing information to the cluster packet processing information according to the packet processing information table, receiving a outside data packet from the outside of the cluster router and processing the received outside data packet to generate the local frame packet processing information.

8. The method according to claim 7, wherein the packet processing information conversion table further comprises: inter-frame distribution information; and before the carrying the cluster packet processing information in the data packet and sending the data packet to another forwarding apparatus, the method further comprises:
according to the inter-frame distribution information, determining a sending port and a destination of sending of the data packet.

9. The method according to claim 7, further comprising:
updating the packet processing information conversion table and the routing table.

10. A cluster routing method, comprising:
generating and distributing a routing table of each forwarding apparatus in a cluster router and a packet processing information conversion table of each forwarding apparatus in the cluster router, wherein the packet processing information conversion table comprises a corresponding relationship between local frame packet processing information and cluster packet processing information; and
converting the local frame packet processing information into the cluster packet processing information according to the packet processing information conversion table; carrying the cluster packet processing information in a data packet and delivering the data packet to another forwarding apparatus; or according to the packet processing information conversion table, converting the cluster packet processing information into the local frame packet processing information; carrying the local frame packet processing information in a data packet and transferring the data packet inside the forwarding apparatus;
wherein the generating and distributing the routing table of each forwarding apparatus in the cluster router and the packet processing information conversion table of each forwarding apparatus in the cluster router comprises:
obtaining a cluster routing view of the cluster router;
obtaining a cluster interface view of the cluster router; and
dividing the cluster routing view and the cluster interface view to generate a routing table and a packet processing information conversion table that correspond to each forwarding apparatus, and distributing the routing table and the packet processing information conversion table to each forwarding apparatus.

11. A cluster router, wherein the cluster router comprises at least one control apparatus and at least two forwarding apparatuses, the control apparatus is connected to the forwarding apparatuses, and the forwarding apparatuses are connected with each other;
the control apparatus is configured to generate and distribute a routing table of each forwarding apparatus and a packet processing information conversion table of each forwarding apparatus, and the packet processing information conversion table comprises a corresponding relationship between local frame packet processing information transferred inside the forwarding apparatus and cluster packet processing information transferred between the forwarding apparatuses; and
the forwarding apparatus is configured to receive the routing table of the forwarding apparatus and the packet processing information conversion table of the forwarding apparatus, which are delivered by the control apparatus; according to the packet processing information conversion table, convert the local frame packet processing information into the cluster packet processing information; carry the cluster packet processing information in a data packet received from the outside and send the data packet received from the outside to another forwarding apparatus; or according to the packet processing information conversion table, convert the cluster packet processing information into the local frame packet processing information; carry the local frame packet processing information in a data packet received from the outside and transfer the data packet received from the outside inside the forwarding apparatus;
wherein the control apparatus comprises:
a routing view module, configured to obtain a cluster routing view of the cluster router;
an interface view module, configured to obtain a cluster interface view of the cluster router; and
a division conversion module, configured to divide the cluster routing view and the cluster interface view, generate a routing table and a packet processing information conversion table that correspond to each forwarding apparatus, and distribute the routing table and the packet processing information conversion table to each forwarding apparatus.

* * * * *